United States Patent [19]

Cope et al.

[11] 3,779,774

[45] Dec. 18, 1973

[54] SILICONE SURFACTANTS FOR VESICULAR FILMS

[75] Inventors: Oswald James Cope, Santa Cruz; Saul W. Chaikin, Menlo Park, both of Calif.

[73] Assignee: Xidex Corporation, Sunnyvale, Calif.

[22] Filed: May 9, 1972

[21] Appl. No.: 251,826

Related U.S. Application Data

[63] Continuation-in-part of Ser. No. 54,011, July 10, 1970, abandoned.

[52] U.S. Cl. ............ 96/87 R, 96/48 R, 96/48 HD, 96/49, 96/75, 96/88, 96/91 R, 96/91 D, 96/91 N, 96/115 R
[51] Int. Cl. ......... G03c 1/52, G03f 7/08, G03c 1/76
[58] Field of Search ............. 96/49, 91 R, 91 N, 96/75, 91 D, 115 R, 88, 35.1, 48 R, 48 HD; 260/2.55

[56] References Cited
UNITED STATES PATENTS

| | | | |
|---|---|---|---|
| 3,498,786 | 3/1970 | Notley et al. | 96/49 X |
| 2,598,453 | 5/1952 | Slifkin | 96/91 R X |
| 2,703,756 | 3/1955 | Herrick et al. | 96/49 |
| 2,834,748 | 5/1958 | Bailey et al. | 260/42 |
| 3,108,872 | 10/1963 | McMahon | 96/49 X |
| 3,260,599 | 7/1966 | Lokkon | 96/75 |
| 3,389,160 | 6/1968 | Reid | 260/448.2 |
| 3,505,377 | 4/1970 | Morehouse | 260/448.2 |
| 3,520,683 | 7/1970 | Kerwin | 96/36.2 X |
| 3,549,376 | 12/1970 | Roos | 96/49 X |
| 3,549,368 | 12/1970 | Collins et al. | 96/115 R X |

FOREIGN PATENTS OR APPLICATIONS

| | | | |
|---|---|---|---|
| 1,141,591 | 1/1969 | Great Britain | 96/49 |

OTHER PUBLICATIONS

Kirk–Othmar, "Encyclopedia of Chemical Technology," 2nd Ed. Wiley & Sons, Vol. 18, 1969, pp. 221–232 and 243–244.
Kirk–Othmar, "Encyclopedia of Chemical Technology," Wiley & Sons, 1953 Vol. 12, pp. 393–409.

*Primary Examiner*—Charles L. Bowers, Jr.
*Attorney*—Townsend & Townsend

[57] ABSTRACT

Silicone surfactants are added to vesicular film vehicles to improve the sensitivity thereof, while further maintaining very small vesicle size in the development image which results in films of improved resolution. Preferred silicone surfactants are polysiloxane-hydroxy substituted alkylenes and polysiloxane-hydroxy substituted oxyalkylenes in which the alkylene and oxyalkylene groups terminate with an amine function.

19 Claims, No Drawings

SILICONE SURFACTANTS FOR VESICULAR FILMS

CROSS REFERENCE TO RELATED APPLICATIONS

This application is a continuation-in-part of Application Ser. No. 54,011, filed July 10, 1970 now abandoned.

This invention relates to vesicular films. More particularly, this invention relates to vesicular films having incorporated therein a silicone surfactant, the incorporation of said surfactant resulting in films of increased sensitivity and improved resolution.

Vesicular films consist essentially of a light-sensitive material dispersed uniformly throughout a polymeric vehicle which is itself coated upon a suitable film base. On exposure to a source of light, such as actinic radiation, the light-sensitive component decomposes to give gas-forming molecules. The film is then heated to its softening point and the gas-forming molecules aggregate and expand to form bubbles in the film. The bubbles so formed reflect light to reproduce the copied image.

In general, diazonium compounds are usually employed in vesicular films as the light-sensitive material, decomposing to liberate nitrogen gas upon exposure to light. The polymeric vehicles employed exhibit very low permeability towards nitrogen.

The polymers which find use in vesicular films may be widely varied and may be homo- or copolymers, addition or condensation polymers. The functionalities which are frequently present are halogen, particularly chloro, nitrile, oxy(hydroxyl and ether) and the like. Examples of suitable polymers include addition polymers such as vinylidene chloride, acrylonitrile, methacrylonitrile, poly (vinyl formal) homopolymers and copolymers and condensation polymers, such as poly (hydroxy ether) derived from dihydroxyphenols and epichlorohydrin. In the preferred embodiment of this invention a vehicle is utilized which is a linear poly (hydroxy ether) of an epichlorohydrin and 2,2'-bis(p- hydroxyphenyl) propane. For a more complete description of poly (hydroxy ether) vehicles, see U. S. Pat. No. 3,622,333, incorporated herein by reference.

As the nitrogen bubble is the basic light scattering particle, comparable to the reduced silver particle in silver halide photography, it is necessary to be able to control the size and size distribution of these bubbles in order to control the optical characteristics of the final vesicular film. Bubble size should be large enough to reflect light yet small enough to provide a film of high resolution.

The size of the bubbles can be controlled to some degree by adjusting the development temperature. Thus, at lower temperatures, the polymer vehicle is more viscous and resists the deformation required for bubble formation, hence, inhibiting bubble growth. Conversely, as the polymer softens at higher temperatures, larger deformations are possible, which accounts for the larger bubble sizes observed under such conditions.

Although smaller bubble size and consequently higher resolution can be obtained at relatively low temperatures for a given polymer vehicle, it has been observed that vesicular films developed at the low end of their development temperature range exhibit inferior image stability at elevated temperatures and high humidities. Also, low development temperatures make inefficient use of the available nitrogen — the gas forms small bubbles but in the same numbers as the larger bubbles formed at higher development temperatures so that there is a net decrease in the overall gas volume generated.

It is therefore desirable to control bubble size and distribution by some means other than that of resorting to lower development temperatures. Such an approach would be to provide a controlled number of nucleation sites at which nitrogen bubble formation would take place. The more nucleation sites available for a given amount of nitrogen released during exposure, the smaller the size of the resulting bubbles, and hence the greater the resolution.

In accordance with the present invention, it has been found that bubble size and distribution may be controlled by the incorporation of a silicone surfactant into the polymer vehicle to thereby improve resolution. It has also been found that the presence of the silicone surfactant increases film sensitivity.

The invention contemplates the use of silicone surfactants in vesicular films. The silicone surfactants have a polysiloxane backbone as the hydrophobic portion and at least one hydrophilic group bonded to the polysiloxane. The polysiloxane normally has methyl groups bonded to silicone, although higher alkyl groups may be employed, e.g., 1 to 12 carbon atoms. The hydrophilic group can be a polyoxyalkylene (alkylene usually of from 2 to 3 carbon atoms), an aminohydroxyalkyl group, wherein the amino group is usually tertiary, ammonium salt (usually tertiary amino) or quaternary, an aminohydroxyalkoxyalkyl group, where the amino group is usually tertiary, ammonium salt, (usually tertiary amino) or quaternary, or a combination thereof.

The silicone surfactants are capable of greatly lowering the surface tension of water. At one weight percent, 25° C, with a du Nouy tensiometer, the silicone surfactants reduce the surface tension below 26 dynes/cm, usually below 24 dynes/cm.

In general, the silicone surfactant materials may be represented broadly by the structure:

$$A-B$$

in which is A is a silicone containing group commonly in the form of a polysiloxane. This portion of the structure has hydrophobic properties. B is an organo group which imparts hydrophilic properties to the composition and often takes the form of a polar group, such as a polyoxyalkylene group, or an aminohydroxy substituted aliphatic group, there being one or more polar groups.

One group of polyoxyalkylene substituted polysiloxane silicone surfactants is found in U.S. Pat. No. 2,834,748. These surfactants have the formula:

wherein $x$ is an integer and represents the number of trifunctional silicone atoms bonded to a single monovalent or multivalent hydrocarbon radical, R'; a is an integer and represents the number of polyoxyalkylene chains in the block copolymer; $y$ is an integer having a value of at least 3 and denotes the number of difunctional siloxane units; n is an integer of from 2 to 4 denoting the number of carbon atoms in the oxyalkylene group; and $z$ is an integer of at least 5 and denotes the length of the oxyalkylene chain. It is understood that these values are normally average values for a composition.

Frequently, the compositions will have $x = 1$, $y$ in the range of 3 to 10, and $z$ is in the range of 5 to 30. For example, Union Carbide's silicone surfactant L-520 has as its average formula:

Another group of suitable silicone surfactants is found in U. S. Pat. No. 3,505,377. These surfactants have the formula

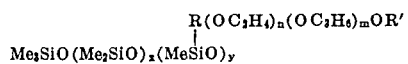

where $R'$ is a monovalent hydrocarbon group containing from 1 to 10 carbon atoms (usually 1 to 4 carbon atoms), R is an alkylene group of from 2 to 4 carbon atoms, $x$ has a value of at least 40 and up to 200 (usually up to 125), $y$ has a value of at least 3, (usually 4 to 15) and m and n are chosen to provide a molecular weight of at least 1,500.

Another group of surfactants within the broad category which may be used herein include those made by General Electric Company (Silicone Products Department) under the designations SF-96, SF-1066, and silicone surfactants made by Hodag Chemical Company under the designations F-1, F-2, FD-82, FD-62 and CO-fluids.

In this invention, unexpectedly superior results are obtained with silicone surfactants of the type:

A-B-Z in which A is a polysiloxane group, B is hydroxy substituted alkylene or hydroxy substituted oxyalkylene, particularly monooxyalkylene, in which the oxygen is in the form of ether linkages, and Z is an amine function selected from dialkyl amino, quaternary ammonium, and amine salts.

Silicone surfactants of this latter preferred type are described in U.S. Pat. No. 3,389,160, the disclosure thereof being incorporated herein by reference. Silicone surfactants of the preferred type A-B-Z are more specifically defined in said patent by the generic formula:

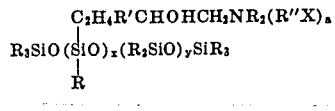

wherein R is a monovalent hydrocarbon group having up to about 18 carbon atoms; $R'$ is a divalent hydrocarbon radical having up to 18 carbon atoms wherein the oxygen in said hydrocarbonoxy radical is present in the form of ether linkages; X is an acid anion; $R''$ is either hydrogen or a group represented by R as hereinbefore defined; a is 0 or 1; $x$ has an average value of from 1 to about 100; $y$ has an average value of from 0 to about 1,000; and the ratio of $y$ to $x$ is no greater than about 50 to 1.

In making up the formulation for preparing a vesicular film in accordance with this invention, the amount of silicone surfactant employed will vary according to the solvent system used, the light-sensitive material and its concentration, and the type of polymer vehicle utilized. While any amount which is effective for increasing film sensitivity and resolution is contemplated, the silicone surfactant will usually constitute about 0.01–5 percent by weight of the polymeric vehicle and preferably about 0.05–2 percent by weight thereof.

The vesiculating agents used in the films of this invention are sensitive to radiation, usually light, so that exposure to radiation causes decomposition and formation of nitrogen. Examples of suitable vesiculating agents include the following:

p-diazo-diphenylamine sulfate
p-diazo-dimethylaniline zinc chloride
p-diazo-diethyl aniline zinc chloride
p-diazo-ethyl-hydroxyethyl aniline 1/2 zinc chloride
p-diazo-methyl-hydroxyethyl aniline 1/2 zinc chloride
p-diazo-2,5-diethoxy-benzoyl aniline 1/2 zinc chloride
p-diazo-ethyl-benzyl aniline 1/2 zinc chloride
p-diazo-dimethyl aniline borofluoride
p-diazo-2,5-dibutoxy-benzoyl aniline 1/2 zinc chloride
p-diazo-1-morpholine benzene 1/2 zinc chloride
p-diazo-2,5-dimethoxy-1-p-tolyl-mercapto benzene 1/2 zinc chloride
p-diazo-3-ethoxy-diethyl aniline 1/2 zinc chloride
2,5,4'-triethoxy-diphenyl-4-diazonium oxalate
p-diazo-diethyl aniline 1/2 zinc chloride
p-diazo-2,5-dibutoxy-1-morpholino benzene chloride zinc chloride
p-diazo-2,5-dimethoxy-1-morpholino-benzene chloride zinc chloride
p-diazo-2,5-diethoxy-1-morpholino-benzene chloride 1/2 zinc chloride
2-diazo-1-napthol-5-sulfonic acid
p-diazo-diethyl aniline borofluoride
p-diazo-2-chloro-diethyl aniline 1/2 zinc chloride.

Other suitable light-sensitive nitrogen forming compounds include the quinone diazides

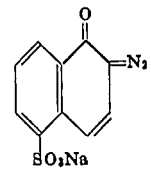

and azide compounds of the type

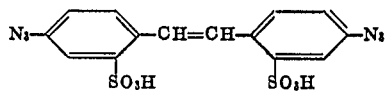

Also useful are the carbazido (carboxylic acid azide) compounds containing a hydroxyl or amino-group in the position *ortho* to the carbazido group, described in U. S. Pat. No. 3,143,418.

The light-sensitive compound may be added to the polymer vehicle in the concentrations normally encountered in vesicular films. In general, the light-sensitive compound which is preferably a diazo compound is added to constitute about 1 – 10 percent by weight of the vehicle but the use of such higher levels does not result in a commensurate improvement in film sensitivity or resolution.

Consistent with the prior art procedures, the preferred technique is to formulate the polymer vehicles and the materials to be disposed therein, such as the vesiculating agents and surfactant in suitable solvents.

The polymer vehicle can be dissolved in a wide range of solvents. Such include methylethyl ketone, tetrahydrofuran, dioxane, 2-ethoxyethyl acetate, chlorinated solvents such as ethylenedichloride, toluene and blends of solvents such as methylethyl ketone/butanol/toluene. Where a diazo compound is used as a vesiculating agent, the diazo compound is preferably dissolved in a small quantity of polar solvent such as methanol, aqueous methanol, acetonitrile or nitromethane and added dropwise to the stirred polymer vehicle. It is preferred but not necessary that the solvent in which the diazo compound is dissolved be compatible with the solvent selected for the polymer vehicle. When the two solvents are compatible, the possibility of the diazo compound or the polymer precipitating out on mixing of the two solutions is minimized.

The silicone surfactants can be dissolved in a wide range of solvents. In general, the preferred solvents are polar and/or have good hydrogen bonding characteristics. It is desirable that these solvents have a boiling point in a range of 50°–160° C. Particularly preferred systems consist principally of one or more of the following solvents: alcohols containing two or more carbon atoms, preferably no more than 5, such as ethanol, propanol, etc., alcohol ethers such as those of the formula $C_nH_{2n+1}OCH_2CH_2OH$, where $n=1-5$; esters such as those of the formula $CH_3COOC_nH_{2n+1}$, where $n=1-5$; ether esters such as those of the formula $C_nH_{2n+1}OCH_2CH_2CH_2OCOCH_3$, where $n=1-5$, cyclic ethers such as 1,4-dioxane and tetrahydrofuran, ketones such as those of the formula $C_xH_{2x+1}COC_yH_{2y+1}$ wherein both $x$ and $y$ are 1–5; nitroalkanes of the general formula $C_nH_{2n+1}NO_2$, where $n=4$, and chlorinated hydrocarbons in which the molar ratio of chlorine to carbon is greater than unity, e.g., chloroform, methylene chloride, trichloroethylene, trichlorethanes, tetrachloroethanes, and the like, including 2,2-dichlorodiethylether and chlorobenzene; and miscellaneous solvents such as dimethylformamide, acetonitrile and tetramethylurea.

In order to indicate more fully the nature of the present invention, the following specific examples are set forth. It will be understood that these examples are presented for illustrative purposes only and they are not intended to limit the scope of the invention in any manner.

EXAMPLE I

Several types of surfactants and dispersing agnets commonly used with vesicular films for improving levelling and flow-out of the coating mix are formulated in a poly-(hydroxy) ether polymer vehicle, derived from bisphenol A and epichlorohydrin and their effect on film sensitivity and bubble size, i.e., resolution, compared.

To 18.75 g of 20 percent solution obtained by diluting Shell's Eponol 55B (40 percent solids in methyl ethyl ketone) with tetrahydrofuran (a methyl ethyl ketone/tetrahydrofuran ratio of 75:25), is added dropwise a solution obtained by dissolving 0.15 g of p-diazo-N, N-diethylaniline zinc chloride in 1.80 g of methanol. To this solution is added 0.75 g of 5 percent by weight solution of surfactant dissolved in methoxy-ethanol.

The diazo compound is dissloved in methanol or dimethyl formamide, the solvent selected depending upon the compatibility of the above solution with the surfactant solution. The combined solution mixture is added dropwise to the polymer, and stirred continuously for a 10 minute period. The film is then cast on 3 mil thick biaxially oriented polyethylene terephthalate (Dupont's Mylar) using a 6 mil clearance Bird applicator, and dried in a forced air oven for ten minutes at 90° C. The dried films are immersed into distilled water maintained at 70° C for thirty seconds and then wiped dry. The resultant films are then exposed through a Kodak No. 3 step table for 30 seconds to two parallel General Electric F65/UBL 80 watt fluorescent tubes situated 2 inches from the tablet surface.

The exposed films are developed immediately by passage through a Canon Kalfile developer (model 100) set at 90° C. The developed samples are then examined under a high powered (X900) microscope to determine the size and distribution of the vesicles. In addition, the optical density of each step is measured using a MacBeth transmission densitometer (Model TD-205, modified to give an F 4.5 aperture).

The optical density measurements are shown in Table I for a series of vesicular films prepared as described above using the different dispersing agents shown.

TABLE I.—OPTICAL DENSITY

| Step number | 1 | 2 | 3 | 4 | 5 | 6 | 7 | 8 |
|---|---|---|---|---|---|---|---|---|
| Dispersing agent: | | | | | | | | |
| None | 0.28 | 0.10 | 0.06 | | | | | |
| Sodium lauryl sulfate (Avirol 116) | 0.90 | 0.55 | 0.25 | 0.10 | 0.05 | | | |
| Sodium dioctyl sulfosuccinate (Stantex T14) | 0.90 | 0.40 | 0.24 | 0.14 | 0.05 | | | |
| Stearyl dimethyl benzyl ammonium chloride (Triton X-400) | 0.50 | 0.25 | 0.10 | 0.06 | | | | |
| A polyether based on alkoxylated triols (Pluradot HA 430) | 0.30 | 0.10 | 0.07 | | | | | |
| Saponin (reagent grade) | 1.08 | 0.72 | 0.40 | 0.26 | 0.18 | 0.10 | 0.10 | |
| Sodium alkylnapthalene sulfonate (Nekal BA-75) | 0.40 | 0.20 | 0.10 | 0.06 | 0.05 | | | |
| Soya lecithin (refined) | 1.44 | 1.00 | 0.40 | 0.10 | | | | |

As step 1 of the step tablet is transparent, each succeeding step increasingly opaque, the step 1 optical density measurement represents the maximum image density possible for the particular film at the given exposure. It can be seen that the surfactants to varying extents improve the optical density.

Film sensitivity is a relative indication of the amount of light necessary to produce a film of a given density. The greater the film sensitivity, the less light required. Alternatively, the more sensitive the film the denser the resultant film image will be for a given exposure. From the table, it is also apparent that the surfactants increase sensitivity, as at a given exposure the film images exhibit greater density.

Microscopic examination of the vesicles produced in all these samples reveals a very wide distribution of vesicle sizes ranging from less than 0.5 microns to greater than 5.0 microns within each sample. This represents an undesirable situation as the larger bubbles tend to lower the ultimate resolution of the vesicular image. Moreover, the presence of large bubbles indicates an inefficient use of the nitrogen generated.

By way of comparison, it has been found that the incorporation of silicone surfactants not only produces significant increases in sensitivity but does so while maintaining very small (0.5 micron or smaller) vesicle size in the developed image, thereby providing improved resolution. The comparison is illustrated in the following example.

EXAMPLE 2

The effect on film resolution and optical density by incorporation of the non-ionic silicone surfactant L540 is determined for three different vesicular films having different polymer vehicles; namely, (1) Shell's Eponol 55, a poly (hydroxyether) derived from bisphenol A and epichlorhydrin, (2) Monsanto's Formvar 7/95S, a poly (vinylformal) and (3) Dow's Saran F120, a vinylidene chloride-acrylonitrile copolymer.

Solutions of polymer, solvent and nitrogen liberating substance are prepared as in Example 1. The Formvar base solution is prepared by dissolving 3.75 g of Formvar 7/95S in 27.50 g of ethylene dichloride and adding dropwise thereto, a solution of 9.15 g of the diazo compound in 1.80 g of methanol. The surfactant is added as a 5 percent solution (0.75 g) in methoxy-ethanol.

The Saran base solution is prepared by dissolving 3.75 g of Saran F/120 in 21.25 g of methyl ethyl ketone and adding thereto 9.15 g of the diazo compound in 1.80 g of methanol. The surfactant was added as 5 percent (0.75 g) solution, L540 in methoxy ethanol. The saponin is added in water. The Eponol base solution is prepared in the same manner, the L540 being added as a 5 percent solution in methyl ethyl ketone.

The films once prepared are coated, dried, water treated and then exposed and developed in the manner described in Example 1. Resolution determination are carried out by exposing the films through a contacting U.S.A.F. target No. 8007P (made by W & LE Gurley, Inc.) to collimated U.V. radiation from a microscopic light (American Optical Company, Model 370) located 12 inches from the sample for 20 seconds. Development is carried out at 95° C.

at a given exposure as compared to films without the silicone dispersing agents or films containing other types of surfactants such as hydrocarbon dispersing agents.

EXAMPLE 3

This example illustrates the unexpectedly exceptional results obtained in accordance with the preferred embodiment in which the vehicle selected is the linear poly (hydroxy ether) described in U.S. Pat. No. 3,622,333, referenced above, (commercially available as Shell's Eponol 55) in combination with the preferred silicone surfactant type A-B-Z as described above. This type of surfactant is commercially available from Union Carbide Corporation under the designation L-79 in which Z is a quaternary ammonium group.

Union Carbide's L-79 is available as a 50 weight percent solution in ethanol. The amount used in the following procedure represents a 1.0 weight percent (based on vehicle polymer) of L-79 surfactant content in the end product.

Vesicular film was prepared using the following solutions:

Solution A was prepared by first stirring together 37.5 g of Shell's Eponol 55 (a 40 weight percent resin solution in MEK) with 37.5 g of 2-methoxyethanol for 30 minutes. To this mixture, was added:

0.60 g of p-diazodiethylaniline zinc chloride dissolved in 4.0 g of 2-methoxyethanol and the stirring continued for 10 minutes.

Solution B was prepared exactly as solution A, except that 1.20 g of a 25 weight percent solution of L-79 in 2-methoxyethanol was added to the diazo solution before it was added in turn to the resin solution.

Coatings of solutions A and B were prepared on 3-mil

TABLE II

| Polymer vehicle | Surfactant | Resolution (lines/mm.) | 1 | 2 | 3 | 4 | 5 | 6 | 7 |
|---|---|---|---|---|---|---|---|---|---|
| FORMVAR 7/95S | None | 64 | 1.10 | 0.76 | 0.40 | 0.14 | 0.06 | | |
| | Avirol 116 [1] | 28 | 1.44 | 1.12 | 0.70 | 0.36 | 0.30 | 0.18 | 0.18 |
| | Silicone L540 [2] | 81 | 1.56 | 1.40 | 0.82 | 0.40 | 0.15 | 0.10 | |
| Saran F120 | None | 114 | 1.32 | 0.92 | 0.33 | 0.18 | 0.06 | | |
| | Saponin | 28 | 1.38 | 0.80 | 0.30 | 0.16 | 0.14 | 0.14 | |
| | Silicone L540 | 144 | 1.56 | 1.44 | 0.08 | 0.40 | 0.08 | 0.05 | |
| Eponol 55B | None | 28 | 1.36 | 0.92 | 0.34 | 0.08 | 0.06 | | |
| | Aerosol A103 [3] | 32 | 1.26 | 0.86 | 0.46 | 0.20 | 0.08 | 0.06 | |
| | Silicone L540 | 144 | 1.42 | 1.14 | 0.68 | 0.30 | 0.15 | 0.10 | 0.06 |

[1] Sodium lauryl sulfate.
[2] Union Carbide Corporation—type described in U.S. Patent No. 3,505,377.
[3] American Cyanamid's disodium ethoxylated nonyl phenol half ester of sulfosuccinic acid.

The U.S.A.F. target used herein is laid over the film to be tested and then subject to image-wise exposure. The target itself is opaque and has a series of lines of different width through which light may pass. After exposure, the vesicular films are developed and the image viewed under a microscope. Resolution, a measure of the ability of the film to reproduce detail, is determined by reference to the finest line (reported as lines per mm) which is reproducible by the film. The results are shown in Table II.

The above reported results show that the films containing L540, a silicone surfactant of this invention, exhibit relatively superior resolution. Microscopic examination of these L540 samples showed consistently small vesicle size (0.5 microns or less). It can also be seen that in each case the presence of the silicone surfactant produces a very pronounced improvement in sensitivity polyester base film (Celanar) using a 4-mil gap doctor blade followed by 5 minutes drying in a 105° C forced-air oven.

A sample of film of a solution A coating and one of a solution B coating, were immersed for 30 seconds in deionized water maintained at 85° C. After wiping free of excess water, these were exposed for 60 seconds through a Kodak step table No. 3 to a Hanovia Mercury arc lamp (rating 350 watts).

The exposed samples were developed by passing through a Canon "Kalfile" 160 developer, set at 110° C.

Transmission density measurements were made using a Macbeth densitometer, modified to give an f 4.5 aperture.

The results of the density measurements are as follows:

OPTICAL DENSITY

| Step number   | 1    | 2    | 3    | 4    | 5    | 6    | 7    | 8    | 9    | 10   | 11   |
|---------------|------|------|------|------|------|------|------|------|------|------|------|
| Without L-79  | 1.50 | 1.36 | 1.30 | 0.94 | 0.54 | 0.12 |      |      |      |      |      |
| With 1.0% L-79| 1.73 | 1.70 | 1.66 | 1.64 | 1.58 | 1.32 | 0.78 | 0.42 | 0.16 | 0.08 | 0.06 |

In addition to the improvement in sensitivity, the incorporation of the L-79 silicone surfactant gives a smooth, flat surface, whereas otherwise, a very uneven poor flow-out phenomena, such as "orange-peel" are obtained.

Resolution of the above film without surfactant was 64 lines/mm whereas with the surfactant resolution was 144 lines/mm. Resolution was measured by exposing the films through a contacting U.S.A.F. target No. 8007p to collimated uv. light from an Illuminations Industries, Inc. (Sunnyvale, California) Model No. 110 lamp for 7 seconds and developing at 110° C in a Canon Kalfile developer.

Additionally, the silicone surfactants provide good levelling properties to the coating solution so that flat, distortion free film surfaces are obtained. This feature is particularly important in contact printing applications wherein maximum resolution can be obtained only when perfect contact between duplicating vesicular film and original master film is effected.

The use of surfactants in vesicular films is not new. For example, in U.S. Pat. No. 3,260,599, it is disclosed to use Saponin as a wetting agent to improve the coatability of a solution being used for making the vesicular films. For the most part, however, surfactants have been used to improve levelling and flow out of the coating mix. Yet, in the published literature surfactants have never been used to improve film sensitivity and resolution.

The silicone surfactants used in this invention differ significantly from the hydrocarbon surfactants previously used with vesicular films in that the silicones have very low cohesive energy densities, which is reflected in unusually low surface tension and solubility parameters. Also surfaces coated with silicones have appreciably lower coefficients of friction than hydrocarbon surfaces.

As an explanation of the improved results obtained, it is believed (though we do not wish to be bound by any theory) that since organic surfactants have aggregation numbers (i.e., numbers of molecules per micelle) of 20-150, and silicone surfactants have aggregation numbers less than 5, the silicone surfactants dispersed through out a polymer vehicle will provide at least four and up to 30 times more micelles than an equal amount of a hydrocarbon surfactant. These micelles (clusters of surfactant molecules with their common ends facing in) act as nucleating sites for vesicle formation. In the developing (heat softening stage), the micelles are sites of low surface tension, allowing bubble formation in the presence of nitrogen under pressure at these loci. As they expand, they represent pressure sinks, and nitrogen in the immediate vicinity feeds the expanding bubble. The larger number of micelles, and consequently of vesicles in a given system, the smaller the size of the resulting vesicles.

It will be appreciated that various modifications and changes may be made in the formulations of the invention, in addition to those described herein, without departing from the spirit of this invention and accordingly the invention is to be limited only by the scope of the appended claims.

What is claimed is:

1. In a vesicular film, including a film base having a polymeric vehicle used for vesicular film coated thereon, wherein said polymeric vehicle is selected from the group consisting of homopolymer or copolymer addition polymers formed from vinylidene chloride, acrylonitrile and methacrylonitrile; poly(vinyl formal) homopolymers and copolymers; and poly (hydroxy ether) condensation polymers derived from dihydroxyphenols and epichlorohydrin, and a light sensitive material uniformly dispersed through said vehicle, which decomposes to give nitrogen gas upon exposure to light, the improvement of which comprises: having in said vehicle an effective amount of a silicone surfactant for increasing film sensitivity and resolution, said silicone surfactant reducing the surface tension of water at a concentration of one weight percent below about 26 dynes/cm at 25° C, wherein said silicone surfactant is of the formula A-B, and A is a polysiloxane group and B is a polyoxyalkylene group; an amine substituted polyoxyalkylene group having the amine substituent as dialkyl amino, quaternary ammonium or amine salt; or an aminohydroxy substituted alkyl or alkoxyalkyl group.

2. A vesicular film according to claim 1, wherein said silicone surfactant reduces the surface tension of water below about 24 dynes/cm at one weight percent concentration at 25° C.

3. A vesicular film according to claim 1, wherein said silicone surfactant has a hydrophobic polysiloxane group and a hydrophilic group which is a polyoxyalkylene group.

4. A vesicular film according to claim 3, wherein said hydrophilic group is an aminohydroxy substituted alkyl or alkoxyalkyl group.

5. A vesicular film according to claim 4, wherein said amino group is a quaternary ammonium group.

6. A vesicular film according to claim 4, wherein said amino group is a dialkyl amino group.

7. In a vesicular film including a film base having a polymeric vehicle for a vesicular film coated thereon, wherein said polymeric vehicle is an addition or condensation polymer, selected from the group consisting of homopolymer or copolymer addition polymers formed from vinylidene chloride, acrylonitrile and methacrylonitrile; poly(vinyl formal) homopolymers and copolymers; and poly (hydroxy ether) condensation polymers derived from dihydroxyphenols and epichlorohydrin, and a light sensitive material uniformly dispersed through said vehicle which decomposes to give nitrogen gas upon exposure to light, the improvement which comprises:

including in said polymeric vehicle from 0.01 to 5 weight percent of a silicone surfactant for increasing the film sensitivity and resolution, said silicone surfactant having a hydrophobic polysiloxane group, and a hydrophilic group which is a polyoxyalkylene group, an aminohydroxy substituted alkyl or alkoxyalkyl group, or a combination thereof, wherein said surfactant reduces the surface tension of water at 25° C below about 24 dynes/cm.

8. A vesicular film according to claim 7, wherein said polymeric vehicle is a polyhydroxy ether.

9. A vesicular film according to claim 7, wherein said polymeric vehicle is a polyvinyl formal.

10. A vesicular film according to claim 7, wherein said silicone surfactant is a block or copolymer of a polysiloxane and a polyoxyalkylene.

11. A vesicular film according to claim 7, wherein said silicone surfactant is a polysiloxane substituted with at least one aminohydroxyalkyl group.

12. A vesicular film according to claim 11, wherein said amino group is quaternary.

13. A vesicular film according to claim 7, wherein said silicone surfactant is a polysiloxane substituted by at least one aminohydroxyalkoxyalkyl group.

14. A vesicular film according to claim 13, wherein said amino group is quaternary.

15. In a vesicular film including a film base having having a polymeric vehicle, which is a linear poly(hydroxy ether) of an epichlorohydrin and a dihydric phenol, coated thereon and a light sensitive material uniformly dispersed through said vehicle which decomposes to give nitrogen gas upon exposure to light, the improvement which comprises having an effective amount of a silicone surfactant which reduces the surface tension of water at a concentration of one weight percent at 25° C to below about 24 dynes/cm, wherein said silicone surfactant is of the formula A-B, and A is a polysiloxane group and B is a polyoxyalkylene group; an amine substituted polyoxyalkylene group having the amine substituent as dialkyl amino, quaternary ammonium or amine salt; or an aminohydroxy substituted alkyl or alkoxyalkyl group.

16. A vesicular film according to claim 15, wherein said silicone surfactant is a polysiloxane substituted by at least one polyoxyalkylene group.

17. A vesicular film according to claim 15, wherein said silicone surfactant is a polysiloxane substituted by at least one quaternary(ammonium)hydroxyalkyl group.

18. A vesicular film according to claim 15, wherein said silicone surfactant is a polysiloxane substituted by at least one dialkyl aminohydroxyalkyl group.

19. A vesicular film according to claim 15, wherein said silicone surfactant is a polysiloxane substituted by at least one ammoniumhydroxyalkyl group.

* * * * *